United States Patent
Kiel Sørensen et al.

(10) Patent No.: US 11,072,131 B2
(45) Date of Patent: Jul. 27, 2021

(54) METHOD OF MANUFACTURING A WIND TURBINE BLADE

(71) Applicant: LM WIND POWER US TECHNOLOGY APS, Kolding (DK)

(72) Inventors: Flemming Kiel Sørensen, Vamdrup (DK); Morten Olesen, Lunderskov (DK)

(73) Assignee: LM WIND POWER US TECHNOLOGY APS, Kolding (DK)

( * ) Notice: Subject to any disclaimer, the term of this patent is extended or adjusted under 35 U.S.C. 154(b) by 46 days.

(21) Appl. No.: 16/310,260

(22) PCT Filed: Jun. 22, 2017

(86) PCT No.: PCT/EP2017/065444
§ 371 (c)(1),
(2) Date: Dec. 14, 2018

(87) PCT Pub. No.: WO2017/220740
PCT Pub. Date: Dec. 28, 2017

(65) Prior Publication Data
US 2019/0176411 A1 Jun. 13, 2019

(30) Foreign Application Priority Data
Jun. 22, 2016 (EP) ..................................... 16175705

(51) Int. Cl.
*B29C 70/34* (2006.01)
*F16B 11/00* (2006.01)
(Continued)

(52) U.S. Cl.
CPC .......... *B29C 70/345* (2013.01); *B29C 70/443* (2013.01); *F03D 1/0675* (2013.01);
(Continued)

(58) Field of Classification Search
CPC ............ F03D 1/0675; F05B 2280/6003; F05B 2280/40; F05B 2230/60; F05B 2230/31;
(Continued)

(56) References Cited

U.S. PATENT DOCUMENTS

| | | | |
|---|---|---|---|
| 4,378,399 A | 3/1983 | Bauer et al. |
| 5,439,737 A | 8/1995 | Trabelsi |

(Continued)

OTHER PUBLICATIONS

Cytec: "FM 300 Epoxy film adhesive", Oct. 9, 2013, XP055330335, http://ww.cytec.com/sites/default/files/datasheets/FM_300_081211-08a.pdf.

(Continued)

*Primary Examiner* — Vishal I Patel
(74) *Attorney, Agent, or Firm* — Nath, Goldberg & Meyer; Jerald L. Meyer; Tanya E. Harkins

(57) ABSTRACT

The present invention relates to a method of manufacturing a wind turbine blade. The method comprises adhesively joining a suction side shell half (69) and a pressure side shell half (68) along respective bond lines (80) at their leading and trailing edges, wherein, prior to joining, an impregnated carrier substrate (76) is arranged in between the shell halves along at least part of said bond lines (80). The carrier substrate (76) is impregnated with at least one compound having a functional moiety. The shell halves may be manufactured by placing a fibre lay-up including one or more fibre layers on a mould surface (66), arranging the impregnated carrier substrate (76) on the inside surface (72) at least along part of its peripheral edge (74) and injecting or infusing the fibre lay-up and the impregnated carrier substrate with a resin and subsequently curing the same.

11 Claims, 4 Drawing Sheets

Figure 1:
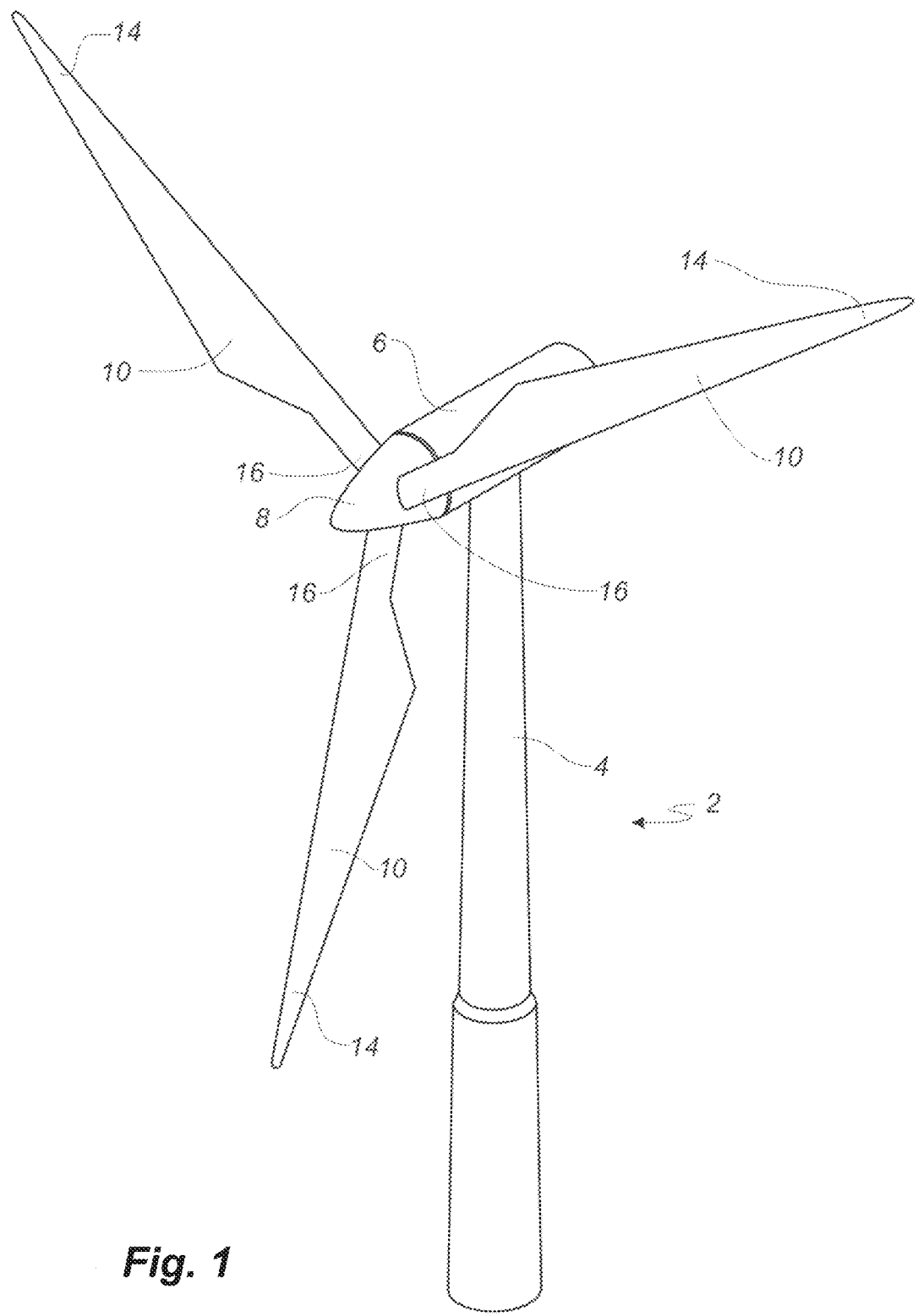

(51) Int. Cl.
*B29C 70/44* (2006.01)
*F03D 1/06* (2006.01)
*B29L 31/08* (2006.01)
*B29K 67/00* (2006.01)
*B29K 309/08* (2006.01)

(52) U.S. Cl.
CPC ........ *F16B 11/006* (2013.01); *B29K 2067/06* (2013.01); *B29K 2309/08* (2013.01); *B29L 2031/085* (2013.01); *F05B 2230/31* (2013.01); *F05B 2230/60* (2013.01); *F05B 2280/40* (2013.01); *F05B 2280/6003* (2013.01); *Y02P 70/50* (2015.11)

(58) Field of Classification Search
CPC ........................ B29L 2031/085; F16B 11/006; Y02P 70/523; B29C 70/345; B29C 70/443; B29K 2309/08; B29K 2067/06
See application file for complete search history.

(56) References Cited

U.S. PATENT DOCUMENTS

| | | | |
|---|---|---|---|
| 2004/0256053 A1 | 12/2004 | Burpo et al. | |
| 2011/0021737 A1* | 1/2011 | Tadepalli | C03C 25/26 528/26 |
| 2015/0314537 A1 | 11/2015 | Dahl et al. | |
| 2016/0168997 A1* | 6/2016 | Garm | F03D 1/0675 416/223 R |
| 2017/0066200 A1* | 3/2017 | Zhang | D06M 15/59 |

OTHER PUBLICATIONS

International Search Report dated Sep. 21, 2017 issued in corresponding International Application No. PCT/EP2017/065444.
Indian First Examination Report dated Jun. 7, 2021 corresponding to application No. 201947002358.

* cited by examiner

METHOD OF MANUFACTURING A WIND TURBINE BLADE

This is a National Phase Application filed under 35 U.S.C. 371 as a national stage of PCT/EP2017/065444, filed Jun. 22, 2017, an application claiming the benefit of European Application No. 16175705.9, filed Jun. 22, 2016, the content of each of which is hereby incorporated by reference in its entirety.

FIELD OF THE INVENTION

The present invention relates to a method of manufacturing a wind turbine blade. In other aspects, the present invention relates to a wind turbine blade obtainable by said method, to an impregnated carrier substrate for use in said method and to the use of an impregnated carrier substrate in the manufacturing of a wind turbine blade.

BACKGROUND OF THE INVENTION

Wind power is becoming increasingly popular due to its clean and environmentally friendly production of energy. The rotor blades of modern wind turbines capture kinetic wind energy by using sophisticated blade design created to maximize efficiency. Turbine blades may today exceed 80 metres in length and 4 metres in width. The blades are typically made from a fibre-reinforced polymer material and comprise a pressure side shell half and a suction side shell half. The cross-sectional profile of a typical blade includes an airfoil for creating an air flow leading to a pressure difference between both sides. The resulting lift force generates torque for producing electricity.

The shell halves of wind turbine blades are usually manufactured using moulds. First, a blade gel coat or primer is typically applied to the mould. Subsequently, fibre reinforcement and/or fabrics are placed into the mould followed by resin infusion. A vacuum is typically used to draw epoxy resin material into the mould. Alternatively, prepreg technology can be used, in which a fibre or fabric pre-impregnated with resin forms a homogenous material which can be introduced into the mould. Several other moulding techniques are known for manufacturing wind turbine blades, including compression moulding and resin transfer moulding. The shell halves are assembled by bonding them together along a chord plane of the blade at bond lines along the trailing and leading edges of the blade. The bond lines are generally formed by applying a suitable bonding paste or adhesive along the bond line at a minimum designed bond width between the shell members.

A typical moulding process includes bagging, resin infusion and subsequent curing. Bagging involves placing a vacuum foil on the fibre material or plies that have been laid up on the mould surface. The vacuum foil is used to press this part to the tool and to allow a vacuum to be drawn into the void formed by the bag and the tool such that the fibres of the part are infused with resin. Typical vacuum foils may be formed by one or more plastic sheets which are placed to cover the blade. Infusion comprises feeding resin under a vacuum to wet the laid out fibres to form a solid shell half. In subsequent curing, heating and subsequently cooling may be applied to harden the resin.

Once the shell halves have sufficiently cured, the vacuum bags are removed and further operations can be performed on the hardened shell halves. Typically, grinding of shell surfaces, in particular of the peripheral edges, is carried out to prepare for the subsequent bonding step. Next, adhesive glue or bonding paste is applied to the edges of the shell halves while in the moulds. The blade moulds are linked via a hinged turning mechanism, and a first of the blade moulds, containing a first shell half, is turned relative to the second mould, such that the first shell half is positioned above the second shell half. This allows for the shell halves to be closed together along the ground edge of the parts, to form a complete wind turbine blade. To allow for secure bonding of the shells together, a suitable pressure is maintained along the exterior surfaces of the shell halves by the blade moulds.

Albeit constituting a potential health risk due to the creation of dust and noise, the above-described grinding step is mandatory in known methods to prepare the edge surface for sufficient adhesion. Another disadvantage of this operation is that it is time consuming and cumbersome.

It is therefore an object of the present invention to overcome one or more of the above-discussed drawbacks of the known methods.

It is another object of the present invention to provide a blade manufacturing method which results in improved work safety and/or process efficiency.

It is another object of the present invention to provide a blade manufacturing method that results in improved bonding strength.

SUMMARY OF THE INVENTION

In a first aspect, the present invention relates to a method of manufacturing a wind turbine blade, the blade having a profiled contour including a pressure side and a suction side, and a leading edge and a trailing edge with a chord having a chord length extending therebetween, the wind turbine blade extending in a spanwise direction between a root end and a tip end, wherein the method comprises adhesively joining a suction side shell half and a pressure side shell half along respective bond lines at said leading and trailing edges, wherein, prior to joining, an impregnated carrier substrate is arranged in between the shell halves along at least part of said bond lines, wherein the carrier substrate is impregnated with at least one compound having a functional moiety, characterized in that the suction side and/or pressure side shell half is manufactured by a process comprising the steps of:

a) placing a fibre lay-up, e.g. comprising glass fibres, including one or more fibre layers on a mould surface to form a shell half structure comprising an aerodynamic outside surface and an opposing inside surface having a peripheral edge, b) arranging the impregnated carrier substrate on said inside surface at least along part of its peripheral edge;

c) injecting or infusing the fibre lay-up and the impregnated carrier substrate with a resin and subsequently curing the same.

The present inventors have found that the impregnated carrier substrate, in particular the functional groups thereof such as hydroxyl groups, will interact with the adhesive or bonding paste to form a bond line with improved bonding strength and structural stability. The impregnated carrier substrate becomes an integral part of the finished blade and helps to improve its stability. At the same time, the manufacturing process is simplified in that previous labour-intensive and hazardous surface grinding operations become unnecessary.

The carrier substrate may be a fabric comprising natural or synthetic textile material. It may take the form of a patch or strip which is impregnated with at least one compound having a functional moiety, such as a polyol compound.

Different materials may be used as carrier substrates, such as lightweight fabrics, patches or strips of natural or synthetic fibres such as polyamide, polyester, cotton, glass or carbon fibre as stitched, knitted, woven or mat arrangement. The compound having a functional moiety, such as a polyol compound, may be applied to the carrier substrate using a suitable solvent. Alternatively, the carrier substrate may be impregnated with a neat compound or a mixture of neat compounds having a functional moiety.

Preferably, the impregnated carrier substrate is arranged in between the shell halves along at least 80%, more preferably along at least 90%, of the length of said bond lines, most preferably along the entire length of said bond lines. The impregnated carrier substrate is advantageously arranged in between the shell halves along at least 50%, such as at least 70% or at least 80%, of the width of the bond line at any given point. In a preferred embodiment, the carrier substrate has a length of at least 20 m, such as at least 30 m or at least 40 m. Advantageously, it has a width of between 0.5 and 50 cm, such as at least 1 cm, more preferably at least 2 cm, most preferably at least 3 cm. The thickness of the carrier substrates may be at least 1 mm, such as at least 2 mm or at least 5 mm.

In other embodiments, the method comprises arranging at least two impregnated carrier substrates in between the shell halves along at least part of said bond lines, preferably at least one impregnated carrier substrate along at least part of the leading edge bond line, and at least one impregnated carrier substrate along at least part of the trailing edge bond line.

It is preferred that the suction side and pressure side shell halves are produced by vacuum assisted resin transfer moulding and that the impregnated carrier substrate is arranged on one or both of the shell halves prior to resin infusion or injection in the moulding operation. Thus, preferably, the impregnated carrier substrate is also infused or injected with the resin used in the moulding operation.

Typically, the blade structure is further reinforced using a number of support members such as shear webs or box beams, which are arranged within the blade and to which the two shell halves may be bonded. Usually, the shear webs are placed on spar caps or main laminates which form part of the inside surface of the shell halves. When such support members are present, it is preferred that the impregnated carrier substrate is also arranged, prior to adhesively joining the shell halves, in between such support members and the inside surface of the shell halves, such as on the main laminate or on a flange of the shear web.

The functional moiety may be selected from carbonyls such as aldehydes, ketones, carboxylic acids, acid anhydrides, ester, amides or acyl halides, hydrocarbons such as alkanes, alkenes or alkynes, aromatics such as benzene derivatives, oxygen-containing groups such as hydroxyl groups, in particular alcohol groups and polyalcohols, carbonates, ethers, epoxies, peroxides, halogen-containing groups such as halo-alkanes, nitrogen-containing groups such as amino groups, amines, such as primary or secondary amines, amides, imines, nitriles, isocyanates, azo compounds, and sulfur-containing groups such as thiols. Preferably, the functional moiety is selected from an amino, an amide, a hydroxyl, a sulfide, an epoxy, a silanol, a carbonyl, a carboxyl, a thiocarbonyl, an ammonium, a nitrile, an imine functional moiety and combinations thereof. More preferably, the functional moiety is selected from a hydroxyl, an amino, a carbonyl, an isocyanate functional moiety and combinations thereof. Thus, the compound having a functional moiety is preferably a carbonyl compound, an alcohol, particularly a polyalcohol, an amine or an isocyanate. It is particularly preferred that the functional moiety is a hydroxyl functional moiety. It has been found that particularly hydroxyl groups, will interact with the adhesive or bonding paste to form a strengthened bond line without the need for grinding of the blade surface prior to bonding.

In a preferred embodiment, the carrier substrate is impregnated with at least one polyol compound. The polyol compound may be a polyether polyol or a polyester polyol.

According to another embodiment, the suction side and/or pressure side shell half is manufactured by a process comprising the steps of:
a) placing a fibre lay-up including one or more fibre layers on a mould surface to form a shell half structure comprising an aerodynamic outside surface and an opposing inside surface having a peripheral edge,
b) arranging the impregnated carrier substrate on said inside surface at least along part of its peripheral edge;
c) injecting or infusing the fibre lay-up and the impregnated carrier substrate with a resin and subsequently curing the same.

In some embodiments, the shell half structure may comprise a bonding flange for the providing an increased surface area for bonding to the other shell half. Typically, a shell half structure will comprise a bonding flange at its leading edge side. In other embodiments, there is a bonding flange on each of the leading edge and trailing edge sides. In one embodiment, the bonding flange(s) extend along the whole length of the leading edge side and/or trailing edge side of the shell half structure. Advantageously, the bonding flange overlaps with an inside surface of the respective other shell half when the shell halves are assembled. The impregnated carrier substrate may be applied to at least part of such bonding flange surface. Advantageously, the impregnated carrier substrate is impregnated before arranging it on the inside surface of the shell half structure.

The fibre material and the impregnated carrier substrate are infused or injected with a resin, such as polyester, which is wetting both the fibre material and the impregnated carrier substrate. Without wishing to be bound by theory, it is believed that the resin and the functional compound in the impregnated carrier substrate, such as a polyol compound, will interact to form reactive surface groups such as hydroxyl groups. Thus an improved bonding surface is created which has an elevated concentration of reactive functional groups, preferably hydroxyl groups, which can react with a suitable adhesive in the subsequent bonding process. The impregnated carrier substrate thus becomes an integral part of the finished blade. This is believed to lead to strong linkage formation (crosslinking) between laminates and structural adhesives.

The resin for infusion or injection in step c) may be an epoxy, polyester or vinyl ester resin. The shell half structure may also comprise an intermediate core material of the shell sandwich structure, which preferably comprises wood and/ or polymer foam, most preferably balsa wood.

According to another embodiment, the blade further comprises one or more shear webs arranged within the blade, each shear web being adhesively joined to the suction side shell half and to the pressure side shell half at respective upper and lower adhesive joints, wherein the impregnated carrier substrate is arranged at the upper and/or lower adhesive joints prior to joining the shear web to the shell halves.

If present, the shear webs act to reinforce the blade structure, and prevent excessive bending or buckling. They are typically bonded to reinforced parts of the inside surface of the respective shell halves, such as spar caps, main laminates or sandwich structures. They may be formed from beam members having or C-shaped cross-sections, the members having a main body with load-bearing flanges extending therefrom at opposed ends of the main body. A method of manufacturing I- or C-shaped webs is through the provision of a sandwich panel body to which layers of fibre material are applied at the opposed ends in the shape of the desired flanges, the fibre material being infused with a resin and subsequently cured to form rigid flanges. It is known to manufacture shear webs in a suitably shaped mould structure, wherein a C-web can be manufactured using a U-shaped mould, where the sandwich panel body extends between opposed walls of the mould structure, with the flanges formed through the lay-up of fibre material against said walls.

It is preferred that the shear web comprises two flanges at its opposing ends, wherein the flanges are connected to spar caps, main laminates or sandwich structures of the respective shell halves. The connection may be provided by applying the impregnated carrier substrate to the shear web flanges or to the main laminates of the shell halves, followed by bonding the shear web flanges to the shell halves using a suitable adhesive.

According to one embodiment, the suction side and pressure side shell halves are joined with an adhesive comprising at least one vinyl ester compound. According to another embodiment, the suction side and pressure side shell halves are joined with an adhesive comprising an isocyanate compound, preferably free isocyanate.

In a preferred embodiment, the resin comprises a polyester compound, preferably an unsaturated polyester compound.

According to another embodiment, the fibre lay-up comprises glass fibres. The fibre lay-up may also comprise carbon fibres, aramid fibres, metallic fibres, such as steel fibres, and/or plant fibres.

According to another embodiment, step c) comprises the application of vacuum, preferably vacuum assisted transfer moulding. In vacuum assisted resin transfer moulding (VARTM), typically glass fibre plies are placed in a mould with the correct orientation and subsequently resin is forced to flow through the fibres using a vacuum pump. This is usually followed by a curing cycle at atmospheric pressure.

According to another embodiment, the method further comprises a step of applying a peel ply on top of the impregnated carrier substrate subsequent to step b), but prior to step c), wherein the peel ply is removed prior to adhesively joining the shell halves. According to another embodiment, the method further comprises a step of laying out a vacuum foil on top of the fibre lay-up and impregnated carrier substrate subsequent to step b), but prior to step c). According to another embodiment, the method further comprises a step of applying a gel coat or primer to the blade mould prior to step a).

In another aspect, the present invention relates to a wind turbine blade obtainable by the above-described method. The resulting blade has been found to exhibit improved bonding strength and structural stability. It is also distinguished from known blades in that it contains the impregnated carrier substrate as an integral part of its structure.

In yet another aspect, the present invention relates to an impregnated carrier substrate for use in above-described method. The carrier substrate may be impregnated with a compound having a functional moiety is selected from an amino, an amide, a hydroxyl, a sulfide, an epoxy, a silanol, a carbonyl, a carboxyl, a thiocarbonyl, an ammonium, a nitrile, an imine functional moiety and combinations thereof. It is particularly preferred that the functional moiety is a hydroxyl functional moiety. In a preferred embodiment, the carrier substrate is impregnated with at least one polyol compound.

According to another embodiment, the carrier substrate has a length of at least 20 m and a width of between 0.5 and 50 cm. In a preferred embodiment, the carrier substrate has a length of at least 20 m, such as at least 30 m or at least 40 m. Advantageously, it has a width of between 0.5 and 50 cm, such as at least 1 cm, more preferably at least 2 cm, most preferably at least 3 cm. The thickness of the carrier substrates may be at least 1 mm, such as at least 2 mm or at least 5 mm.

In another aspect, the present invention relates to the use of an impregnated carrier substrate in the manufacturing of a wind turbine blade, wherein the impregnated carrier substrate is brought into contact with at least one adhesive for adhesively joining a suction side shell half to a pressure side shell half, wherein the carrier substrate is impregnated with at least one compound having a functional moiety.

Preferably, the functional moiety is selected from an amino, an amide, a hydroxyl, a sulfide, an epoxy, a silanol, a carbonyl, a carboxyl, a thiocarbonyl, an ammonium, a nitrile, an imine functional moiety and combinations thereof. In a preferred embodiment, the functional moiety is a hydroxyl functional moiety. Most preferably, the carrier substrate is impregnated with at least one polyol compound.

DETAILED DESCRIPTION OF THE INVENTION

Figure 2:
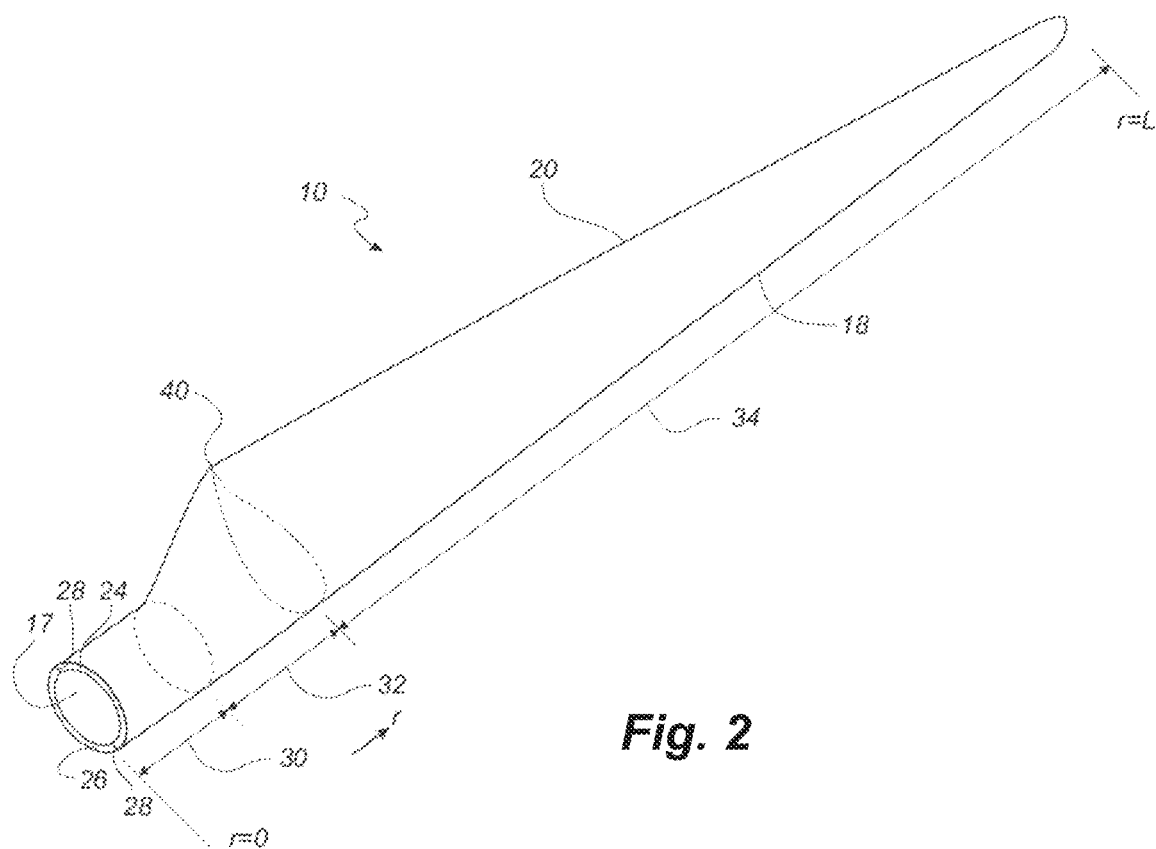
Figure 3:
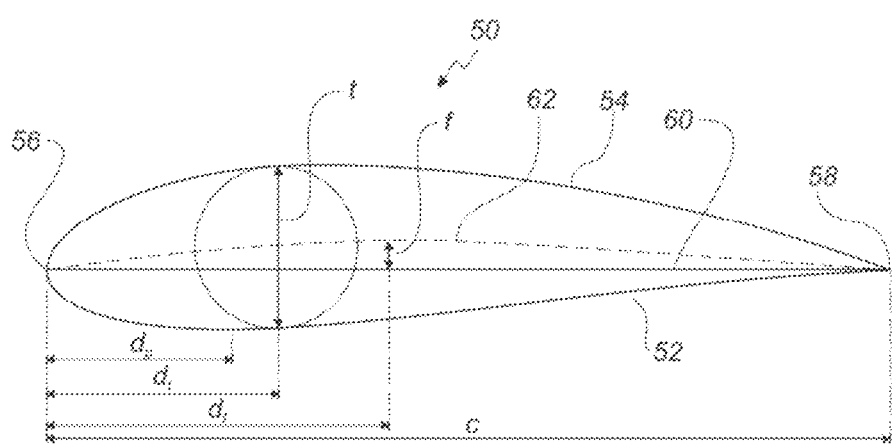
Figure 4:
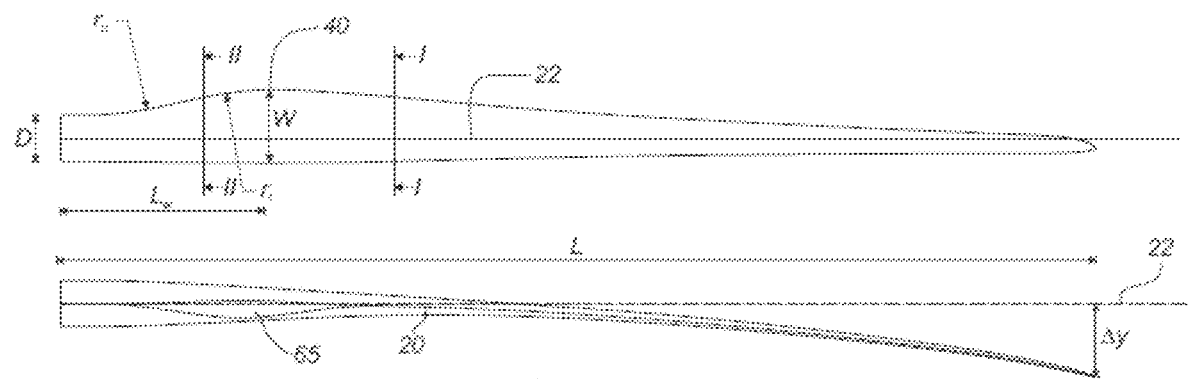
Figure 5:
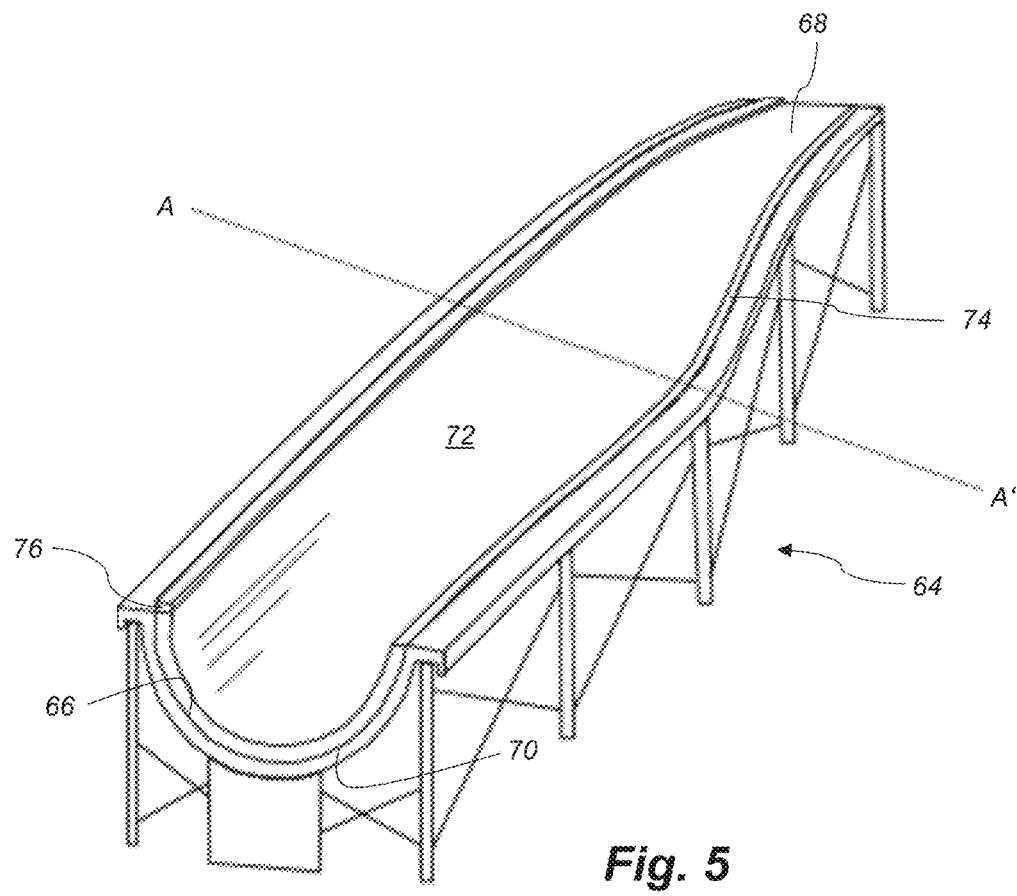
Figure 6:
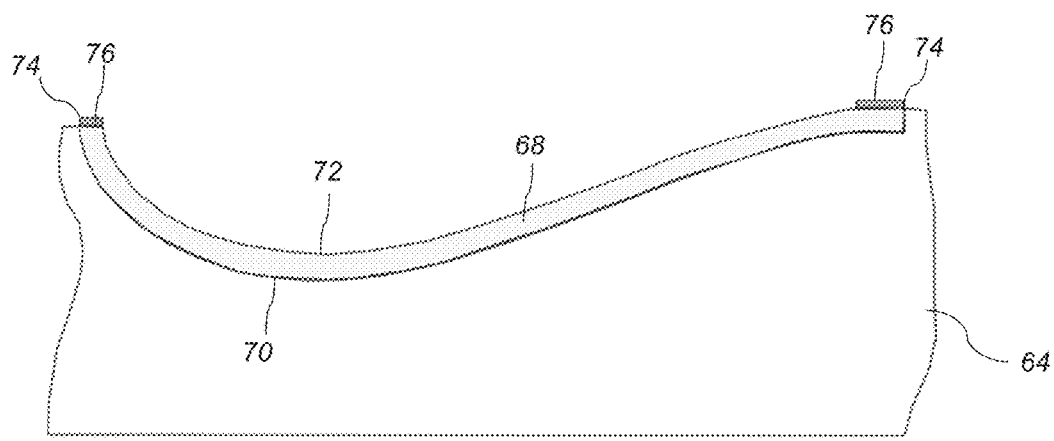
Figure 7:
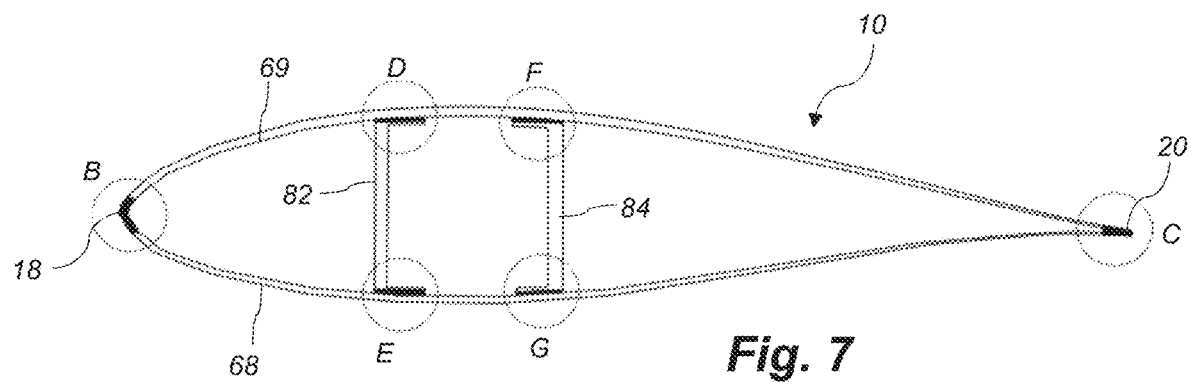
Figure 8:
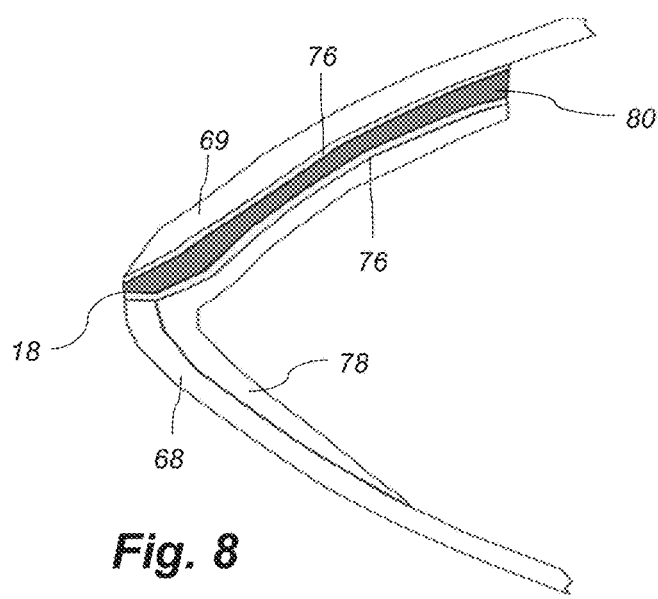

The invention is explained in detail below with reference to embodiments shown in the drawings, in which FIG. 1 shows a wind turbine, FIG. 2 shows a schematic view of a wind turbine blade, FIG. 3 shows a schematic view of an airfoil profile through section I-I of FIG. 4, FIG. 4 shows a schematic view of the wind turbine blade, seen from above and from the side, FIG. 5 is a perspective drawing of a shell half structure of the present invention in a mould, FIG. 6 shows an enlarged cross section of the shell half structure of FIG. 5 taken along the line A-A', FIG. 7 is a cross-sectional view of a wind turbine blade according to the present invention, and FIG. 8 is an enlarged view of section B in FIG. 7.

DETAILED DESCRIPTION

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

FIGS. 3 and 4 depict parameters which are used to explain the geometry of the wind turbine blade according to the invention.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the blade. The blade has a total blade length L. As shown in FIG. 3, the root end is located at position r=0, and the tip end located at r=L. The shoulder 40 of the blade is located at a position $r=L_w$, and has a shoulder width W, which equals the chord length at the shoulder 40. The diameter of the root is defined as D. The curvature of the trailing edge of the blade in the transition region may be defined by two parameters, viz. a minimum outer curvature radius $r_o$ and a minimum inner curvature radius $r_i$, which are defined as the minimum curvature radius of the trailing edge, seen from the outside (or behind the trailing edge), and the minimum curvature radius, seen from the inside (or in front of the trailing edge), respectively. Further, the blade is provided with a prebend, which is defined as Δy, which corresponds to the out of plane deflection from a pitch axis 22 of the blade.

FIG. 5 illustrates a blade mould 64 with a mould surface 66 for moulding a shell half 68 of a wind turbine blade. The moulding process involves placing a fibre lay-up including one or more fibre layers such as glass fibres on the mould surface 66. The shell half structure 68 comprises an aerodynamic outside surface 70 and an opposing inside surface 72 having a peripheral edge 74. As illustrated only on the left hand side of FIG. 5, an impregnated carrier substrate 76 in the form of a fabric strip is placed on the inside surface along its peripheral edge 74. Subsequently, the fibre lay-up and the impregnated carrier substrate are infused with a resin to create a fibre reinforced structure.

This is further illustrated in the cross sectional view of FIG. 6, which is taken along the line A-A' in FIG. 5. As contrasted to FIG. 5, the embodiment shown in FIG. 6 has impregnated carrier substrates 76 placed on both sides along the peripheral edge 74 of the inside surface 72 of the shell half structure 68. FIG. 7 is a cross-sectional view of a blade 10 of the present invention illustrating different bond lines B, C and adhesive joints D, E, F, G onto which the impregnated carrier substrate of the present invention can be applied prior to adhesive bonding. A pressure side shell half 68 is adhesively joined to a suction side shell half 69 along respective bond lines at the leading edge 18 and trailing edge 20 of the blade (see circles B and C). The impregnated carrier substrate 76 is placed between the shell halves 68, 69, which is best seen in the enlarged view of encircled are B in FIG. 8. In this embodiment, the pressure side shell half 68 comprises a bonding flange 78 for improved bonding with the suction side shell half 69. The impregnated carrier substrate is placed on the respective shell halves 68, 69 including the bonding flange 78, preferably prior to resin infusion in vacuum assisted resin transfer moulding. After curing, the shell halves 68, 69 including the impregnated carrier substrates 76 are adhesively bonded along a bond line 80 using a suitable adhesive or bonding paste.

As also shown in FIG. 7, the blade 10 comprises a leading edge shear web 82 and a trailing edge shear web 84, both of which are substantially C-shaped. Both shear webs 82, 84 are adhesively bonded to the respective shell halves 68, 69, preferably to spar caps or main laminates integrated in the latter (not shown). The impregnated carrier substrate may be placed onto the upper and/or lower flanges of the shear webs and/or on the respective inside surfaces of the shell halves 68, 69, i.e. on the main laminates, prior to bonding.

The invention is not limited to the embodiments described herein, and may be modified or adapted without departing from the scope of the present invention.

LIST OF REFERENCE NUMERALS 2 wind turbine
4 tower
6 nacelle
8 hub
10 blade
14 blade tip
16 blade root
18 leading edge
20 trailing edge
22 pitch axis
30 root region
32 transition region
34 airfoil region
40 shoulder/position of maximum chord
50 airfoil profile
52 pressure side
54 suction side
56 leading edge
58 trailing edge
60 chord
62 camber line/median line
64 blade mould
66 mould surface
68 pressure side shell half
69 suction side shell half
70 outside surface of shell half
72 inside surface of shell half
74 peripheral edge of inside surface
76 carrier substrate
78 bonding flange
80 bond line
82 leading edge shear web
84 trailing edge shear web
c chord length
$d_t$ position of maximum thickness
$d_r$ position of maximum camber
$d_p$ position of maximum pressure side camber
f camber
L blade length
r local radius, radial distance from blade root
t thickness
Δy prebend

The invention claimed is:

1. A method of manufacturing a wind turbine blade, the blade (10) having a profiled contour including a pressure side and a suction side, and a leading edge (18) and a trailing edge (20) with a chord having a chord length extending therebetween, the wind turbine blade (10) extending in a spanwise direction between a root end (16) and a tip end (14), wherein the method comprises adhesively joining a suction side shell half (69) and a pressure side shell half (68) along respective bond lines (80) at said leading and trailing edges, wherein, prior to the step of adhesively joining, an impregnated carrier substrate (76) is arranged in between the suction side and the pressure side shell halves along at least part of said bond lines (80), wherein the carrier substrate (76) is impregnated with at least one compound having a functional moiety, wherein the impregnated carrier substrate (76) comprises a fabric formed from natural or synthetic textile material, and wherein the impregnated carrier substrate (76) comprises a patch or a strip, characterized in that the suction side and/or pressure side shell half is manufactured by a process comprising the steps of:

a) placing a fibre lay-up, including one or more fibre layers, on a mould surface (66) to form a shell half structure comprising an aerodynamic outside surface (70) and an opposing inside surface (72) having a peripheral edge (74);
b) arranging the impregnated carrier substrate (76) on said inside surface (72) at least along part of its peripheral edge (74); and
c) injecting or infusing the fibre lay-up and the impregnated carrier substrate with a resin and subsequently curing the same.

2. The method of manufacturing a wind turbine blade according to claim 1, wherein the functional moiety is selected from a hydroxyl, an amino, a carbonyl, an isocyanate functional moiety and combinations thereof.

3. The method of manufacturing a wind turbine blade according to claim 1, wherein the functional moiety is a hydroxyl functional moiety.

4. The method of manufacturing a wind turbine blade according to claim 1, wherein the compound having a functional moiety is a polyol compound.

5. The method of manufacturing a wind turbine blade according to claim 1, wherein the blade further comprises one or more shear webs (82, 84) arranged within the blade, each shear web being adhesively joined to the suction side shell half (69) and to the pressure side shell half (68) at respective upper and lower adhesive joints, wherein the impregnated carrier substrate (76) is arranged at the upper and/or lower adhesive joints prior to joining the shear web to the shell halves.

6. The method of manufacturing a wind turbine blade according to claim 1,
wherein the suction side and pressure side shell halves (69, 68) are joined with an adhesive comprising at least one vinyl ester compound, and/or
wherein the suction side and pressure side shell halves (69, 68) are joined with an adhesive comprising an isocyanate compound, preferably free isocyanate.

7. The method of manufacturing a wind turbine blade according to claim 1, wherein the resin comprises a polyester compound, preferably an unsaturated polyester compound.

8. The method of manufacturing a wind turbine blade according claim 1,
wherein step c) comprises the application of vacuum, and/or
wherein the method further comprises a step of applying a peel ply on top of the impregnated carrier substrate (76) subsequent to step b), but prior to step c), wherein the peel ply is removed prior to adhesively joining the shell halves, and/or
wherein the method further comprises a step of laying out a vacuum foil on top of the fibre lay-up and impregnated carrier substrate subsequent to step b), but prior to step c).

9. The method of manufacturing a wind turbine blade according claim 1, wherein the method further comprises a step of applying a gel coat or primer to the blade mould prior to step a).

10. The method of manufacturing a wind turbine blade according to claim 1, wherein the fibre lay-up comprises glass fibres.

11. The method of manufacturing a wind turbine blade according to claim 8, wherein the application of the vacuum comprises vacuum assisted transfer moulding.

* * * * *